(12) United States Patent
Thornqvist

(10) Patent No.: US 11,376,674 B2
(45) Date of Patent: Jul. 5, 2022

(54) KIT FOR A MILLING TOOL AND A MILLING TOOL

(71) Applicant: SANDVIK INTELLECTUAL PROPERTY AB, Sandviken (SE)

(72) Inventor: Johan Thornqvist, Uppsala (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 300 days.

(21) Appl. No.: 16/493,439

(22) PCT Filed: Jan. 4, 2018

(86) PCT No.: PCT/EP2018/050193
§ 371 (c)(1),
(2) Date: Sep. 12, 2019

(87) PCT Pub. No.: WO2018/166665
PCT Pub. Date: Sep. 20, 2018

(65) Prior Publication Data
US 2020/0047262 A1    Feb. 13, 2020

(30) Foreign Application Priority Data

Mar. 13, 2017  (EP) .................................... 17160524

(51) Int. Cl.
*B23C 5/24* (2006.01)
*B23C 5/06* (2006.01)
(Continued)

(52) U.S. Cl.
CPC .............. *B23C 5/06* (2013.01); *B23C 5/2226* (2013.01); *B23C 5/24* (2013.01); *B23C 2226/125* (2013.01); *B23C 2226/315* (2013.01)

(58) Field of Classification Search
CPC .............. B23C 5/241; B23C 2226/125; B23C 2226/315; B23C 2270/06; B23C 5/2486;
(Continued)

(56) References Cited

U.S. PATENT DOCUMENTS 4,470,731 A * 9/1984 Erkfritz ................. B23C 5/2489
407/38
4,600,341 A   7/1986 Board
(Continued)

FOREIGN PATENT DOCUMENTS

EP    2893995 A1   7/2015
EP    2893997 A1   7/2015
(Continued)

*Primary Examiner* — Sara Addisu
(74) *Attorney, Agent, or Firm* — Corinne R. Gorski

(57) ABSTRACT

A tool body and at least one cassette for a milling tool. The tool body includes at least two identical insert seats, each insert seat being configured to support a cutting insert arranged to be mounted therein. At least one side contact surface is provided in each insert seat for supporting a bottom support surface and at least one side support surface of the cutting insert. The cassette has a peripheral side surface including at least one side support surface and at least one insert seat configured to support a cutting insert. The at least one side support surface and a bottom support surface of the cassette are configured to be supported by the at least one contact surface of any one of the insert seats of the tool body, the cassette being configured to be detachably mounted in any one of the identical insert seats of the tool body.

13 Claims, 7 Drawing Sheets

(51) Int. Cl.
*B23C 5/08* (2006.01)
*B23C 5/22* (2006.01)

(58) Field of Classification Search
CPC .... B23C 5/06; B23C 5/20; B23C 5/24; B23C 5/2226
See application file for complete search history.

(56) References Cited

U.S. PATENT DOCUMENTS

| | | | | |
|---|---|---|---|---|
| 5,716,167 | A * | 2/1998 | Siddle | B23C 5/241 407/36 |
| 6,109,838 | A * | 8/2000 | Riviere | B23C 5/2221 407/36 |
| 9,636,759 | B2 * | 5/2017 | Buob | B23C 5/2462 |
| 2006/0165501 | A1 * | 7/2006 | Heinloth | B23C 5/08 409/199 |
| 2007/0071560 | A1 * | 3/2007 | Karonen | B23B 27/16 407/34 |
| 2007/0104546 | A1 * | 5/2007 | Maeta | B23C 5/06 407/113 |
| 2007/0292219 | A1 * | 12/2007 | Craig | B23C 5/207 407/48 |
| 2008/0226402 | A1 * | 9/2008 | Kammermeier | B23C 5/06 407/38 |
| 2011/0020080 | A1 * | 1/2011 | Zettler | B23C 5/207 407/113 |
| 2011/0299946 | A1 * | 12/2011 | Hecht | B23C 5/207 407/42 |
| 2012/0039678 | A1 * | 2/2012 | Nguyen | B23C 5/20 407/113 |
| 2012/0195700 | A1 * | 8/2012 | Chen | B23C 5/2221 407/40 |
| 2012/0230794 | A1 * | 9/2012 | Leisner | B23C 5/08 409/234 |
| 2013/0129434 | A1 * | 5/2013 | Bhagath | B23C 5/207 407/51 |
| 2014/0003872 | A1 * | 1/2014 | Kovac | B23C 5/22 407/11 |
| 2014/0234036 | A1 * | 8/2014 | Atar | B23C 5/109 407/40 |
| 2015/0037107 | A1 * | 2/2015 | Buob | B23C 5/2462 407/44 |
| 2015/0266112 | A1 * | 9/2015 | Morrison | B23C 5/2269 407/108 |
| 2016/0023288 | A1 * | 1/2016 | Morrison | B23C 5/06 407/11 |
| 2017/0232533 | A1 * | 8/2017 | Crespin | B23C 5/06 407/44 |
| 2018/0264562 | A1 * | 9/2018 | Zettler | B23C 5/2472 |
| 2020/0398352 | A1 * | 12/2020 | Arumugam | B23C 5/207 |
| 2021/0001417 | A1 * | 1/2021 | Wuerfels | B23B 27/145 |
| 2021/0245263 | A1 * | 8/2021 | Bennett | B23C 5/241 |

FOREIGN PATENT DOCUMENTS

| | | |
|---|---|---|
| EP | 3009216 A1 | 4/2016 |
| FR | 1362568 A | 6/1964 |
| WO | 97/02916 A1 | 1/1997 |
| WO | 2009048098 A1 | 4/2009 |

* cited by examiner

KIT FOR A MILLING TOOL AND A MILLING TOOL

RELATED APPLICATION DATA

This application is a § 371 National Stage Application of PCT International Application No. PCT/EP2018/050193 filed Jan. 4, 2018 claiming priority to EP 17160524.9 filed Mar. 13, 2017.

TECHNICAL FIELD OF THE INVENTION

The present invention relates to a kit comprising a tool body and a cassette for a milling tool for chip removing machining. It further relates to a milling tool comprising such a kit.

The milling tool according to the invention may preferably be configured for face milling or shoulder milling, although it should not be regarded as limited to those applications.

By a cassette, sometimes also referred to as a cartridge, is herein intended a device adapted to be mounted to a tool body and adapted to support a cutting insert both in a tangential direction parallel to the direction of rotation of the tool body and in axial as well as radial directions of the tool body.

BACKGROUND OF THE INVENTION AND PRIOR ART

Milling tools of the above mentioned kind for chip removing machining of metal workpieces are generally composed of a rotatable tool body and a plurality of replaceable cutting inserts made of cemented carbide, ceramics, or other hard material, mounted in seats of the tool body. The cutting inserts are preferably indexable with a plurality of index positions to prolong the service life of the cutting inserts. In particular in face milling tools, one or two of a plurality of mutually identical chip removing cutting inserts may be replaced by wiper inserts, configured for forming a smoother surface finish on the workpiece surface. The wiper inserts have a relatively long wiper edge for achieving said surface finish, and therefore often have a different shape with fewer index positions than the other chip removing cutting inserts. In addition, the size of the wiper inserts may be relatively large in comparison with the other chip removing cutting inserts, so that the relatively long wiper edge projects further toward the surface of the workpiece than the cutting edges of the other cutting inserts, whereby the wiper edges are able to finish the machined surface of the workpiece and remove irregularities created during the face milling operation. Thus, the wiper inserts not only have fewer index positions, but may also require more hard material in the form of e.g. cemented carbide or ceramics for production of each wiper insert in comparison with the other chip removing cutting inserts. The wiper inserts thereby become less cost efficient in comparison with the other chip removing cutting inserts.

Furthermore, for some applications and in particular for the milling of specific workpiece materials, it is required that the cutting edge is made of cubic boron nitride (CBN) or polycrystalline diamond (PCD). In these cases, a CBN or PCD tip is usually brazed or otherwise attached to a cemented carbide insert body. The number of index positions of such cutting inserts is typically also reduced in comparison with a single material cutting insert.

In certain types of milling tools, in particular face milling tools, one or more cassettes are provided for mounting in cassette seats of the tool body. The cassette in turn holds a cutting or wiper insert mounted in an insert seat therein. The milling tool may be provided with several cassette seats, each configured to support an adjustable cassette in which the cutting or wiper insert is mounted. The position of the wiper insert can hereby be adjusted in relation to the other chip removing cutting inserts. The cassette can also provide versatility since the cassettes may be provided with different insert seats adapted to hold different types of cutting inserts, so that the same tool body can be used for different cutting inserts and in various milling applications.

EP3009216 discloses an example of a face milling tool in which the tool body is formed with two types of seats (i.e. insert seats and cassette seats). Hence, the first type of seat is adapted for directly receiving a cutting insert and the second type of seat is adapted for receiving a cassette in which a cutting insert is mounted. In this case, the cassette allows an axial adjustment of the cutting insert mounted therein for allowing surface finishing of the workpiece surface.

However, in the milling tools discussed above, the tool body is required to be formed with cassette seats which are relatively spacious, and the tool body is thereby weakened in comparison with a milling tool without cassettes.

SUMMARY OF THE INVENTION

It is an objective of the present invention to provide a solution to the above mentioned problems, which solution increases versatility and cost efficiency in milling applications without compromising the strength of the tool body. Another objective is to provide a solution that can reduce the material costs, in particular for applications requiring a wiper edge or cutting edges of CBN or PCD.

At least the first objective is, according to a first aspect of the invention, achieved by means of the initially defined kit comprising a tool body and a cassette for a milling tool, which is characterised in that the at least one side support surface and the bottom support surface of the cassette are configured to be supported by the at least one side contact surface and the bottom contact surface, respectively, of any one of the identical insert seats of the tool body, so that the cassette is configured to be detachably mounted in any one of the identical insert seats.

Hence, the kit according to the invention allows an exchangeable mounting of cassettes and chip removing cutting inserts in the insert seats of the tool body. Accordingly, a cassette can be mounted in any one of the insert seats in the place of a chip removing cutting insert. Thus, the tool body can be made equally strong as a tool body configured to be used without cassettes. At the same time, it is possible to mount a cassette holding a different type of cutting insert in one or more of the insert seats of the tool body. The versatility of a milling tool comprising the tool body is thereby increased without compromising the strength of the tool body. In other words, the same tool body used for a rough face milling operation with identical chip removing cutting inserts mounted in all insert seats of the tool body can also be used for a finishing face milling operation with a wiper insert mounted in a cassette replacing at least one of the chip removing cutting inserts. The same tool body may also be provided with (improved) ramping capability by replacing at least one of the chip removing cutting inserts by a cassette in which a cutting insert with a cutting edge arranged for ramping is mounted. Furthermore, the insert seat of the cassette is much smaller than the insert seat of the tool body, so the cutting insert mounted therein is consequently also much smaller. Thus, a relatively small amount of hard material is needed for manufacturing this cutting insert and the cost is reduced, while the same functionality is achieved as in the case of a milling tool in which one of the chip removing cutting inserts is replaced by a special cutting insert such as a wiper insert or a ramping insert.

The kit according to the invention may also be used with cassettes mounted in all seats of the tool body. This may be advantageous for applications that require that the cutting edge is made of cubic boron nitride (CBN) or polycrystalline diamond (PCD), since the cutting inserts can be made smaller and the amount of cemented carbide needed to produce the cutting inserts is reduced. Hence, the CBN/PCD cutting inserts may in this case be produced as chip removing cutting inserts configured for mounting in insert seats of the cassettes.

It is also possible to use different kinds of cassettes mounted in the insert seats of the tool body, wherein the different kinds of cassettes are provided with different insert seats for receiving different kinds of cutting inserts. For example, a plurality of cassettes configured to receive chip removing cutting inserts may be provided, and one or two other cassettes having a seat configured to receive a wiper insert or a ramping insert.

The bottom contact surface of the insert seat of the tool body is configured to support the cassette or the cutting insert, whichever is mounted in the insert seat, in a tangential direction being parallel to the direction of rotation of the tool body about the central axis of rotation. The at least one side contact surface of the insert seat of the tool body is configured to support the cassette or the cutting insert in the axial and radial directions of the milling tool. Typically, the insert seat may however be provided with two side contact surfaces for said axial and radial support.

The insert seat(s) of the cassette(s) is/are hereby positioned and configured so that a cutting edge of a cutting insert mounted therein is active during the relevant machining operation of the cutting insert. In other words, the insert seat(s) of the cassette is/are configured for receiving the relevant cutting insert and is/are positioned such that the (indexable) cutting edge of the relevant cutting insert is active in for instance roughing, surface finishing or ramping operations, respectively. For instance, a wiper insert and a ramping insert may be differently shaped and thereby arranged in differently configured seats, which are located in different positions on the cassette such that the cutting edges become active in surface wiping and ramping operations, respectively, when the cassette is mounted in the insert seat of the tool body.

According to one embodiment, the cassette comprises two insert seats formed in the transition between the upper side and the side surface. In this embodiment, the cassette is very versatile and may be used with one or two cutting inserts mounted therein depending on the desired milling operation. For example, one of the insert seats may be configured to receive a cutting insert for a particular milling operation, such as ramping, while the other insert seat may be configured to receive a cutting insert for surface wiping or the main chip removing roughing operation.

According to one embodiment, the cassette comprises a means for adjusting a position of the cassette within the insert seat of the tool body. The position of the cutting edge of a cutting insert mounted in the cassette can thereby be fine-tuned so that a desirable machining precision is achieved. If for instance the tool body is arranged for face milling including wiper insert(s) mounted in the cassette(s), the axial position of the wiper edge(s) can be adjusted to a desired position in relation to the cutting edges of the other cutting inserts. This is also particularly advantageous if two or more cassettes are configured to receive wiper inserts, which are mounted in the tool body, in which case the two or more wiper edges may need individual adjustment in order to be situated at the same axial level for achieving a smooth surface finish and an even wear between all the wiper inserts. A cassette without the means for adjusting the position of the cassette within the insert seat may however be used in the case when only one cassette for receiving a wiper insert is mounted in the tool body, and/or in any case when the exact relative position between the cutting edges are non-crucial, such as when the cassette(s) is/are configured to receive a cutting insert for ramping.

According to one embodiment, the means for adjusting a position comprises a positioning screw and a hole for receiving the positioning screw between a major portion and a minor portion of the cassette, the major and minor portions being separated by two grooves extending between the hole and the peripheral side surface of the cassette, so that the means for adjusting the position is adapted to, upon turning of the positioning screw in the hole, adjust a distance between the major portion and the minor portion of the cassette, wherein the minor portion comprises said side support surface of the cassette. This may preferably be the side support surface for supporting the cassette in the axial direction, so that the axial position of for instance a wiper edge can easily be adjusted by operating the positioning screw.

According to one embodiment, the cassette is made of steel. Steel hereby provides a suitable inherent elasticity to allow an elastic deformation upon operating the above mentioned positioning screw for adjusting the distance between the minor and major portion of the cassette. The material cost of the cassette is furthermore relatively small in comparison with the material cost of a cutting insert which the cassette is replacing in the tool body. The overall cost of a milling tool in which the kit is used is thereby reduced.

According to a second aspect of the invention, at least the first objective is achieved by means of a milling tool for chip removing machining, comprising:
  the proposed kit,
  a primary cutting insert comprising a cutting edge and being configured to be mounted in one of the identical insert seats of the tool body, wherein the primary cutting insert has a bottom support surface configured to be supported by the bottom contact surface of the insert seat and at least one side support surface configured to be supported by the at least one side contact surface of the insert seat when the primary cutting insert is mounted therein, and
  a secondary cutting insert comprising a cutting edge and being configured to be mounted in the at least one insert seat of the cassette,
wherein the cassette is mountable in one of the identical insert seats of the tool body. Thus, the support surfaces of the cassette and the primary cutting insert, respectively, are configured so that each of the primary cutting insert and the cassette can be mounted in any one of the insert seats of the tool body. Of course, the milling tool may comprise several primary cutting inserts, each mounted in one of the identical insert seats of the tool body. The milling tool may also comprise several cassettes. The milling tool thereby becomes very versatile, since it can be adapted for use in a variety of milling operations. Further advantages of the proposed milling tool appear from the above description of the proposed kit.

The milling tool according to the invention is advantageously a face milling tool or a shoulder milling tool. The primary cutting inserts are preferably indexable and may be single-sided but are preferably double-sided.

According to one embodiment, the secondary cutting insert comprises a wiper edge, wherein the insert seat of the cassette is configured to receive the secondary cutting insert so that, when the cassette is mounted in the insert seat of the tool body, the wiper edge extends perpendicularly in relation to the central axis of rotation and is situated axially foremost at the front end of the milling tool for performing a surface finishing operation during face milling. Hence, the secondary cutting insert in this embodiment is a so called wiper insert. The wiper edge is relatively long and slightly curved (i.e. include a large radius of curvature as known surface wiping edges) and arranged to extend for said surface finishing of the workpiece surface. The face milling tool in this embodiment provides a cost efficient alternative to face milling tools in which one or two of the cutting inserts are replaced by wiper inserts adapted to be mounted directly in the insert seats of the tool body.

According to one embodiment, the secondary cutting insert comprises a main cutting edge, wherein the insert seat of the cassette is configured to receive the secondary cutting insert so that, when the cassette is mounted in the insert seat of the tool body, the main cutting edge extends at an entering angle for a main chip removing machining operation. Hence, in a face milling tool, the secondary cutting insert in the form of a wiper insert may be formed with both a wiper edge and a main cutting edge configured for the main chip removing machining (roughing), i.e. peripheral chip removal at an entering angle to the surface of the workpiece. This increases the efficiency of the milling tool. This is also an advantageous embodiment in the case where CBN or PCD cutting edges are needed for chip removal.

According to one embodiment, the secondary cutting insert comprises a ramping edge, wherein the insert seat of the cassette is configured to receive the secondary cutting insert so that, when the cassette is mounted in the insert seat of the tool body, the ramping edge extends along a radially inner portion of the insert seat for cutting during a ramping operation of the milling tool. This allows a face/shoulder milling tool to be used also for ramping operations, which is normally difficult due to insufficient clearance behind a surface generating cutting edge of the primary cutting inserts in such a tool. By replacing one of the primary cutting inserts with a cassette having a cutting insert with a ramping edge mounted therein, i.e., a cutting edge extending at an angle radially inwards in relation to the workpiece surface with a relatively large clearance behind it, a ramping operation is enabled. The ramping insert may e.g. be a round cutting insert with a positive cutting geometry.

According to one embodiment, the cassette comprises two insert seats and the milling tool comprises two secondary cutting inserts, each mounted in one of the insert seats of the cassette. Two relatively small secondary cutting inserts optimised for different milling operations can thereby be provided, such as one ramping insert and one cutting insert comprising a main cutting edge configured for main chip removing machining (roughing). Of course, a cassette with two insert seats can also be used with only one cutting insert mounted in one of the insert seats.

According to one embodiment, the secondary cutting insert is a single-sided indexable cutting insert with a positive cutting geometry. It is thereby possible to provide several alternately usable cutting edges having sufficient clearance behind the active cutting edge of the secondary cutting insert, regardless of whether the secondary cutting insert is a wiper insert or a ramping insert. The single-sided indexable secondary cutting insert configured as a wiper insert and/or a main chip removing (roughing) insert for a face milling operation may hereby preferably have a rhombic basic shape. A single-sided indexable secondary cutting insert configured for ramping may preferably have a round basic shape.

According to one embodiment, the cutting edge of the secondary cutting insert comprises a portion made of cubic boron nitride (CBN) or polycrystalline diamond (PCD). The milling tool is thereby particularly suitable for specific workpiece materials or demanding applications requiring an edge with excellent hot hardness that can be used at high cutting speeds (CBN), or with excellent wear resistance (PCD). This is particularly advantageous if the cutting edge provided with a CBN or a PCD portion is a main cutting edge or a wiper edge. A milling tool may comprise several cassettes having such secondary cutting inserts mounted therein.

According to one embodiment, the primary cutting insert is an indexable face milling insert having several indexable cutting edges, wherein each indexable cutting edge comprises a main cutting edge configured for a main chip removing machining operation and a secondary cutting edge configured for a surface finishing operation. The milling tool is thereby configured for efficient face milling.

Further advantageous features and advantages of the invention will appear from the following detailed description.

BRIEF DESCRIPTION OF THE DRAWINGS

Embodiments of the invention will in the following be described by means of non-limiting examples with reference to the appended drawings, in which:

FIG. 12b is a cross sectional view along the line XIIb-XIIb in FIG. 12a, and FIG. 12c is a cross sectional view along the line XIIc-XIIc in FIG. 12a.

DETAILED DESCRIPTION OF EMBODIMENTS OF THE INVENTION

Figure 1:
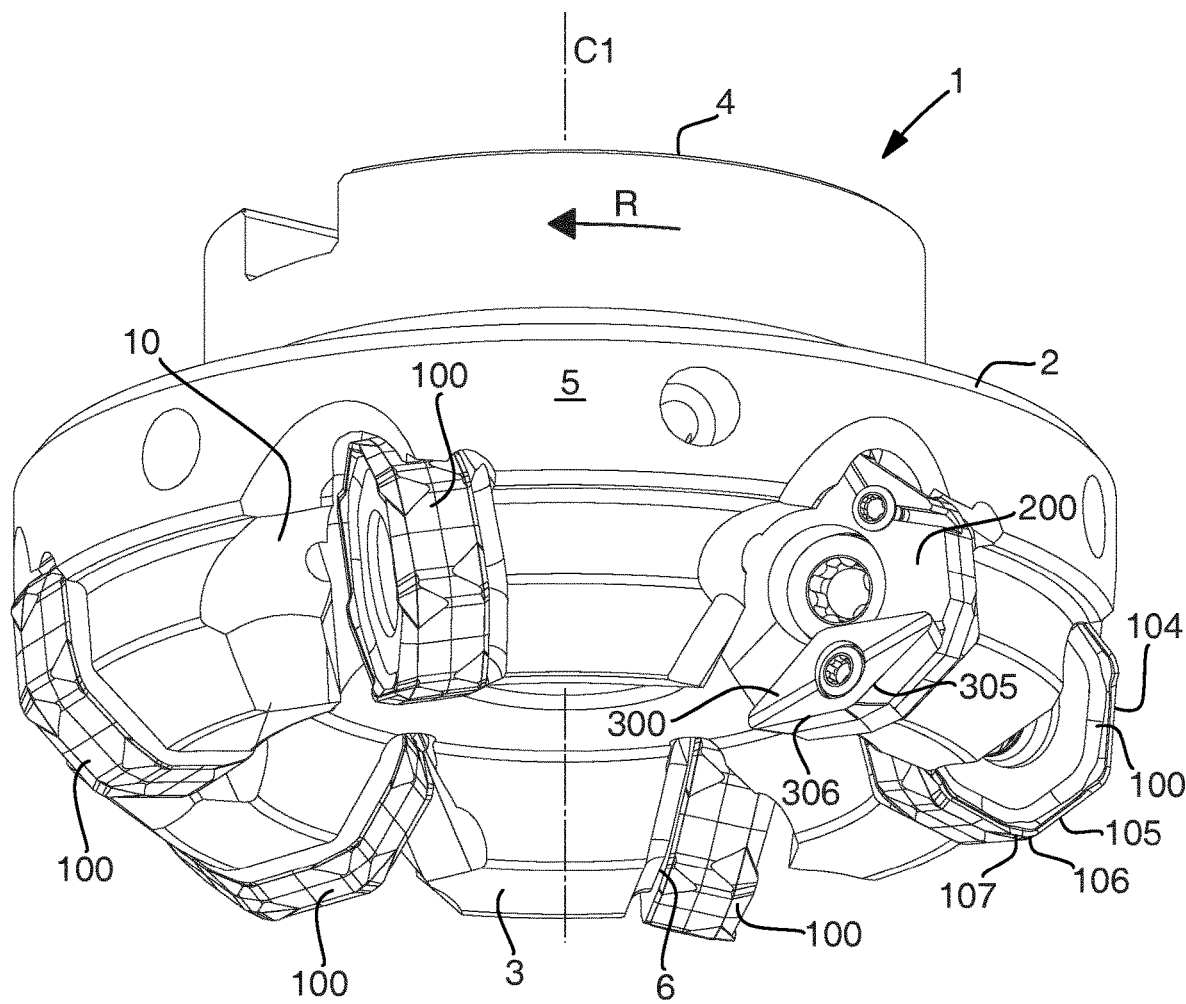
FIG. 1 is a perspective view showing a milling tool according to a first embodiment of the invention.

Milling tools 1 according to a first embodiment and a second embodiment of the invention are shown in FIGS. 1-7 and FIGS. 8-11, respectively. Common elements of the milling tool 1 according to the first and the second embodiment will in the following be described using common reference numerals.

The milling tool 1 is in both embodiments a face milling tool and has a tool body 2 with a front end 3 and a rear end 4, between which a central axis C1 of rotation and a peripheral envelope surface 5 extend. A plurality of identical insert seats 6 are formed in a transition between the front end 3 and the peripheral envelope surface 5. Each insert seat 6 is configured to receive and support an indexable primary cutting insert 100 adapted to be detachably mounted therein by means of a screw 7. A bottom contact surface 8 and two side contact surfaces 9a, 9b are provided in each seat 6 for supporting the primary cutting insert 100 when mounted in the tool body 2. A chip pocket 10 is provided in front of each seat in a direction of rotation R of the tool body 2.

Figure 4:
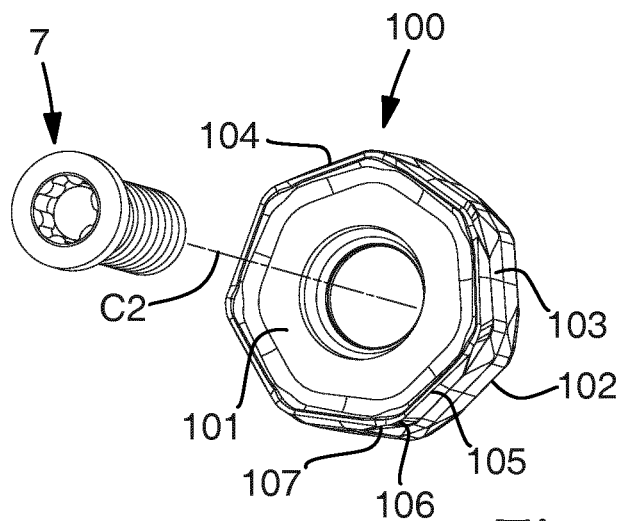
FIG. 4 is a perspective view of a cutting insert used in the milling tool in FIG. 1.

In both of the shown embodiments, each indexable primary cutting insert 100 is single-sided with a polygonal basic shape and comprises an upper side 101 and a lower side 102 between which a centre axis C2 extends as shown in FIG. 4. The upper side 101 and the lower side 102 are connected by a peripheral side surface 103. In a transition between the upper side 101 and the peripheral side surface 103, a cutting edge 104 comprising seven identical and alternately usable main cutting edges 105 configured for a main chip removing machining during face milling. In other words, the primary cutting insert has a total of seven index positions. The cutting edge 104 also comprises two secondary cutting edges 106, 107 configured for, depending on the entering angle κ (see FIG. 3), surface finishing of the workpiece surface during face milling. This is described in detail in EP2893995. In the shown embodiment, the entering angle K is approximately 42°, in which case the secondary cutting edge 107 acts as a surface-wiping edge, while the secondary cutting edge 106 acts as a corner chamfer edge.

Figure 2:
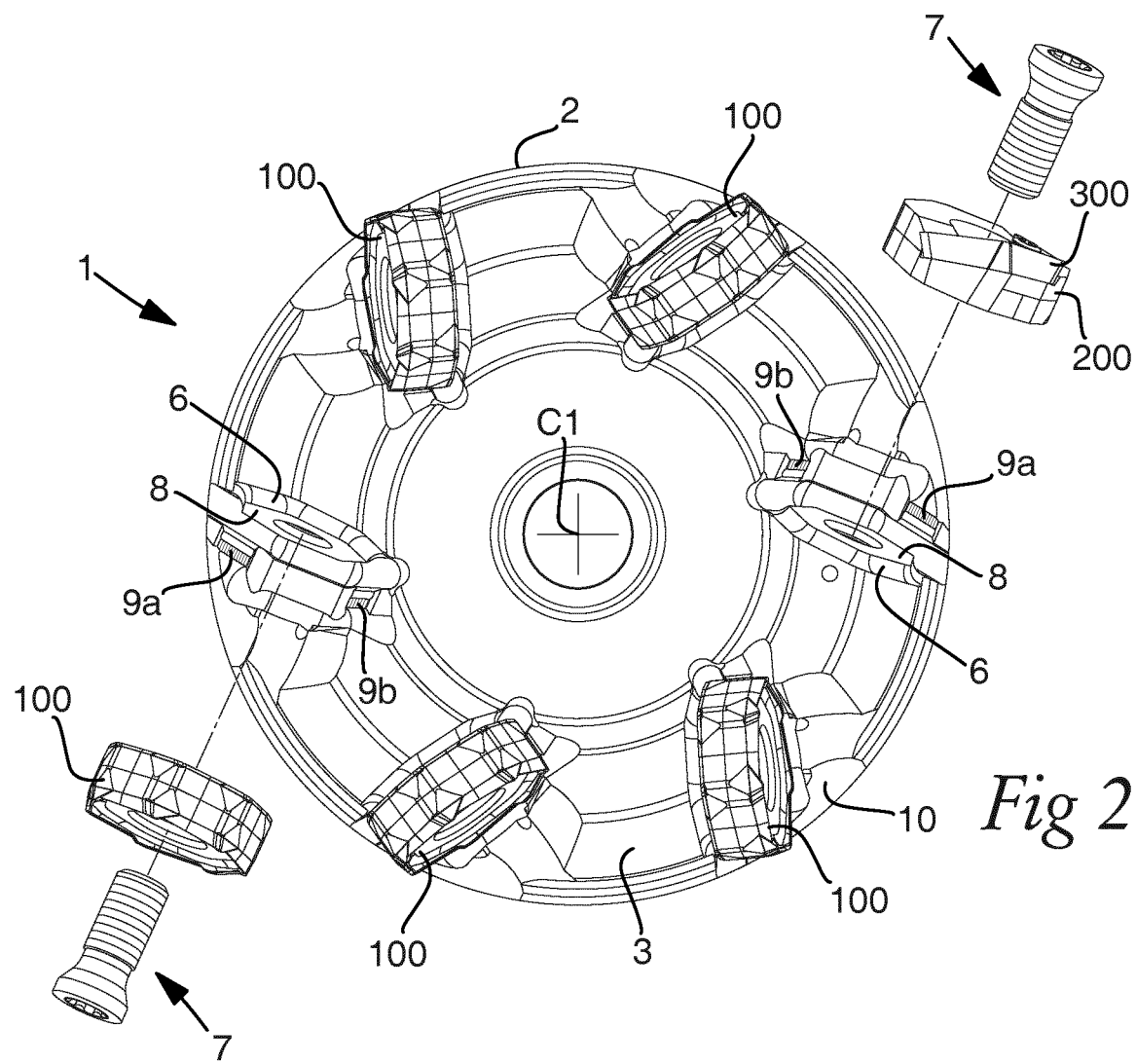
FIG. 2 is a front end view of the milling tool in FIG. 1.
Figure 3:
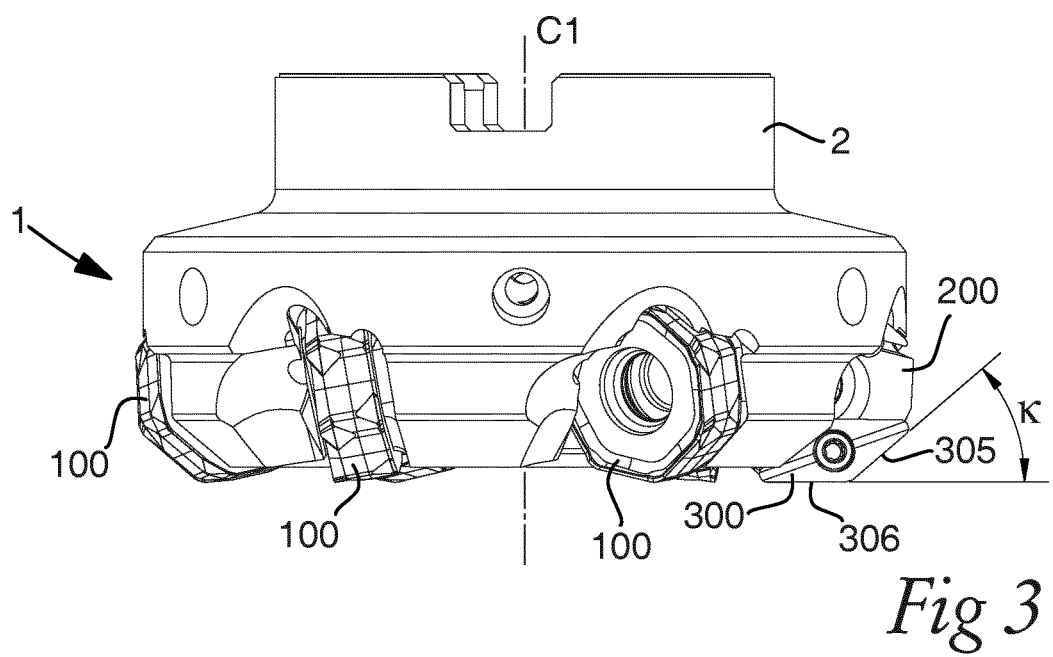
FIG. 3 is a side view of the milling tool in FIG. 1.
Figure 10A:
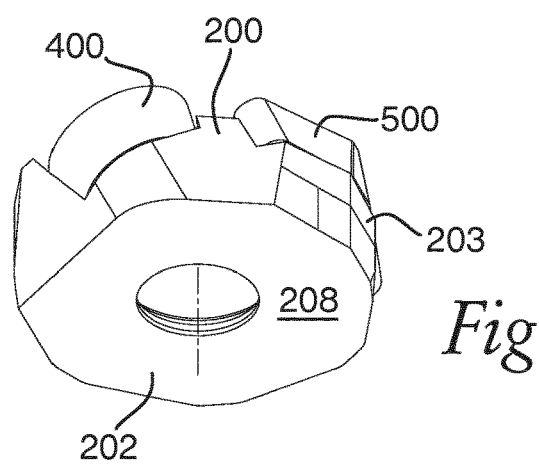
FIG. 10a is a perspective view of the cassette and cutting inserts in FIG. 9.
Figure 10B:
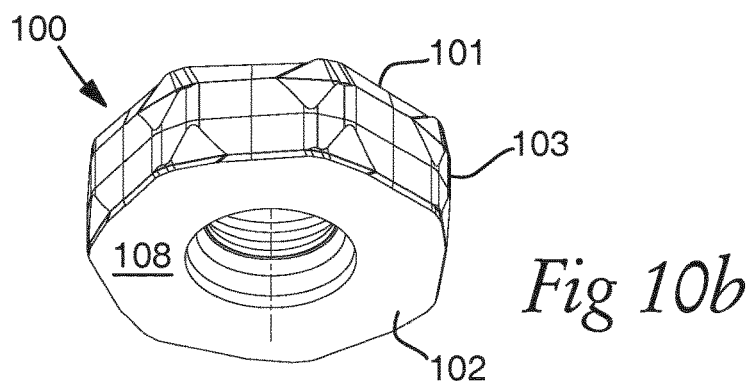
FIG. 10b is a perspective view of the cutting insert shown in FIG. 4.

The lower side 102 of the primary cutting insert 100, shown in FIG. 10b, comprises a planar bottom support surface 108 configured to be supported by the bottom contact surface 8 of the insert seat 6 of the tool body 2. The peripheral side surface 103 of the primary cutting insert 100 comprises, for each index position, two side support surfaces 109a, 109b which rest against the side contact surfaces 9a, 9b of the insert seat 6 when the primary cutting insert 100 is mounted in the tool body 2. This can be seen in FIG. 7 and FIGS. 12a-12c. The side contact surfaces 9a, 9b are also shown in FIG. 2, in which these surfaces have been highlighted by means of hatching.

It is to be noted that although the shown primary cutting insert 100 is single-sided, a double-sided primary cutting insert with cutting edges extending around both the upper and the lower sides may also be used. Such cutting inserts are disclosed in EP2893997 and EP2893995.

Figure 5:
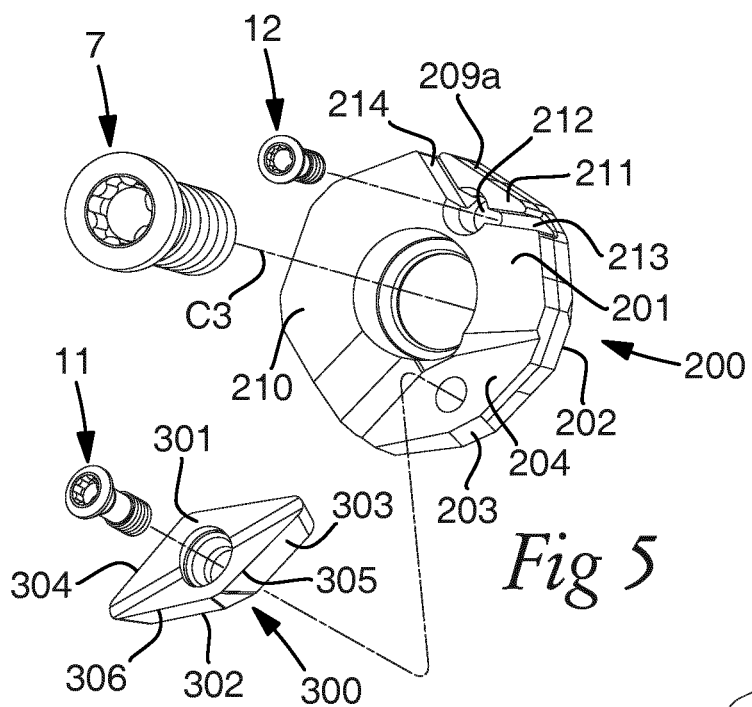
FIG. 5 is an exploded view of a cassette and a cutting insert used in the milling tool in FIG. 1.
Figure 6:
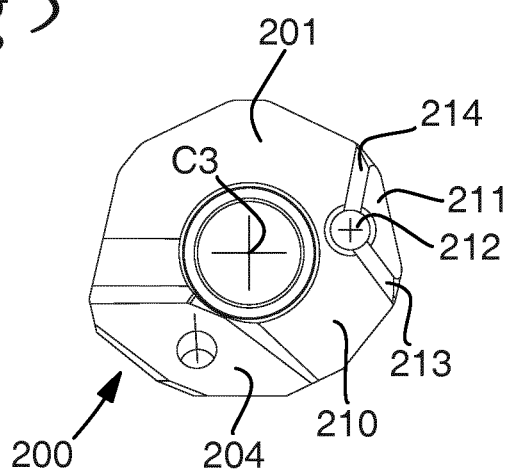
FIG. 6 is a top view of the cassette in FIG. 5.
Figure 7:
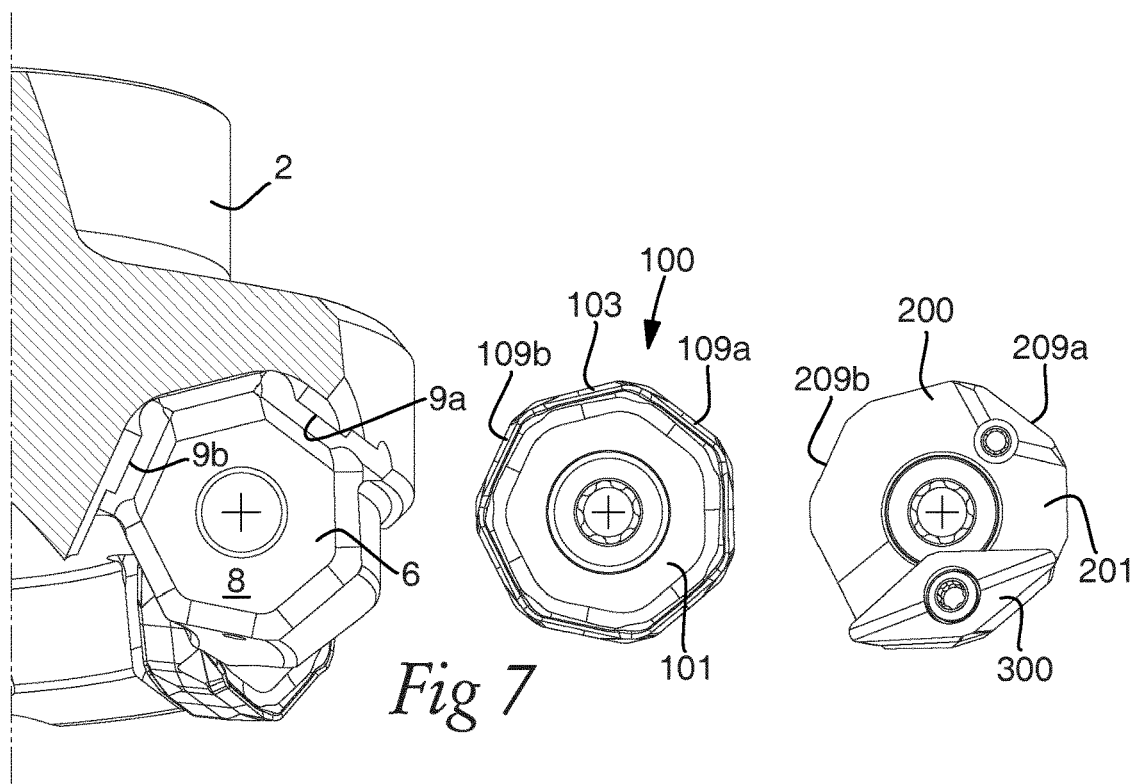
FIG. 7 shows parts of the milling tool in FIG. 1.
Figure 8:
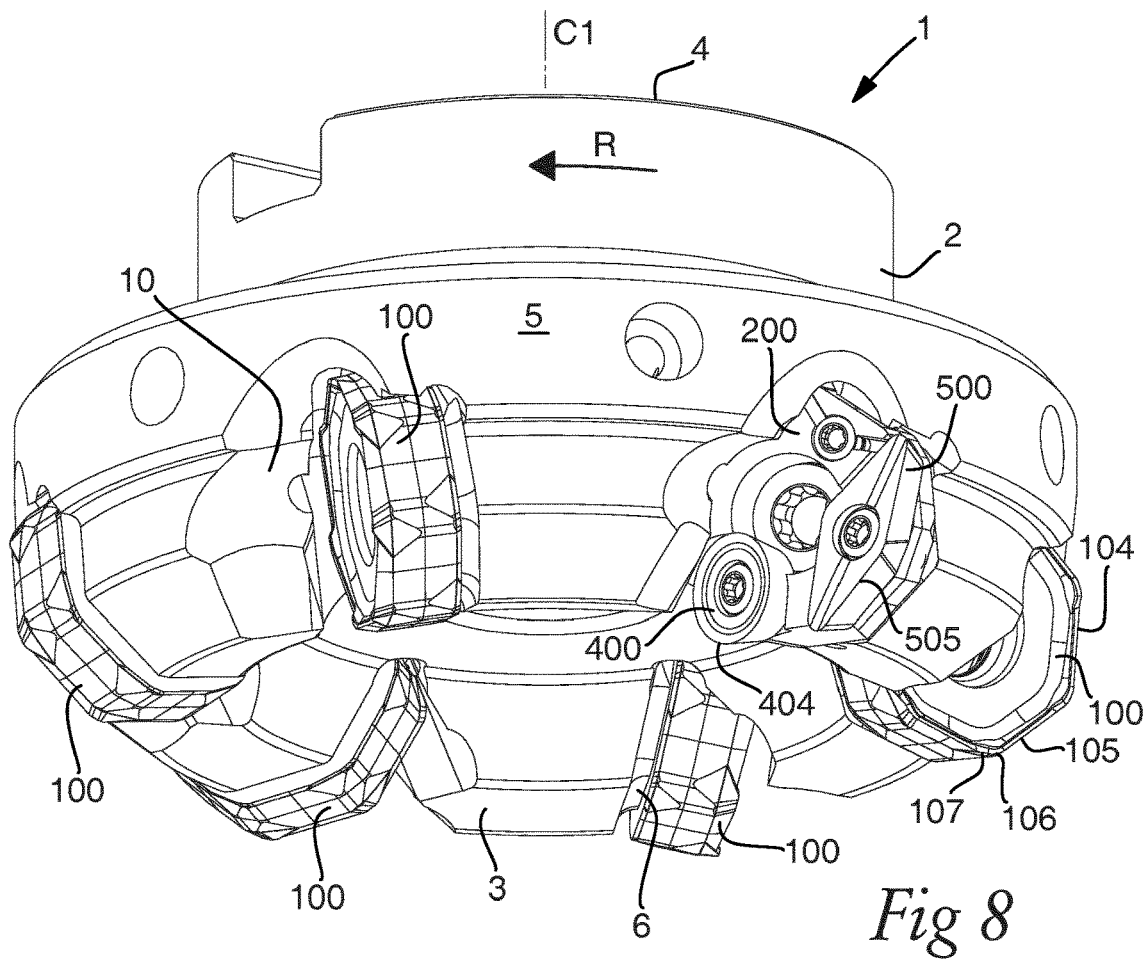
FIG. 8 is a perspective view showing a milling tool according to a second embodiment of the invention.
Figure 9:
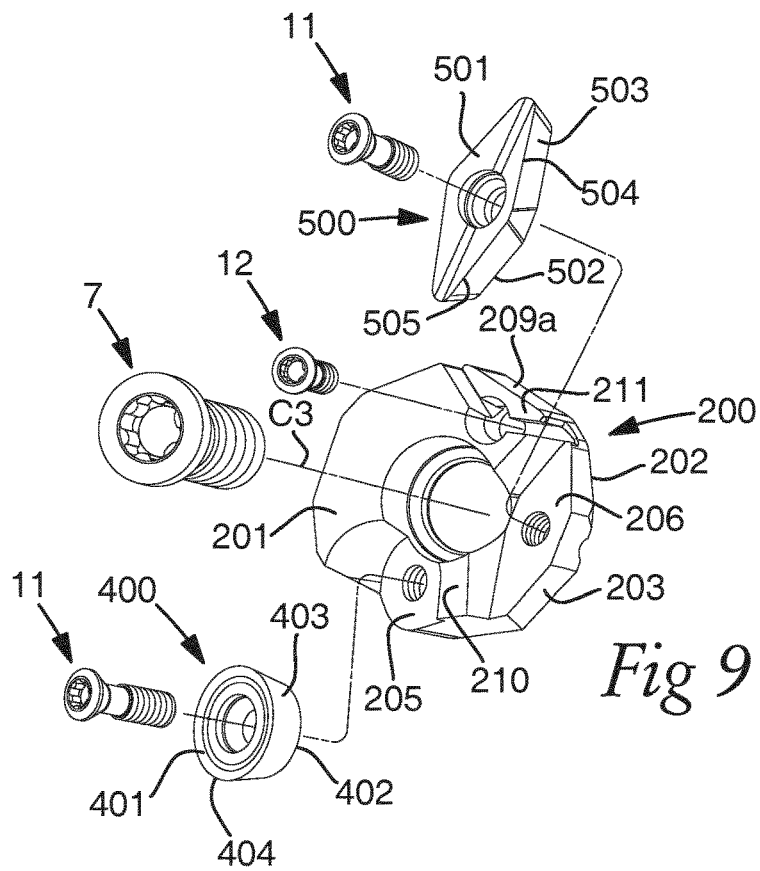
FIG. 9 is an exploded view of a cassette and cutting inserts used in the milling tool in FIG. 8.

In one of the insert seats 6 of the tool body 2, a cassette 200 is mounted instead of a primary cutting insert 100. The cassette used in the milling tool 1 according to the first embodiment is shown in FIG. 5-6, and the cassette used in the milling tool according to the second embodiment is shown in FIG. 9. The cassette 200 is configured to be mounted in the same insert seats 6 as the primary cutting inserts 100 and therefore has similar dimensions. Like the primary cutting inserts 100, the cassette 200 is mounted using a screw 7.

Figure 11A:
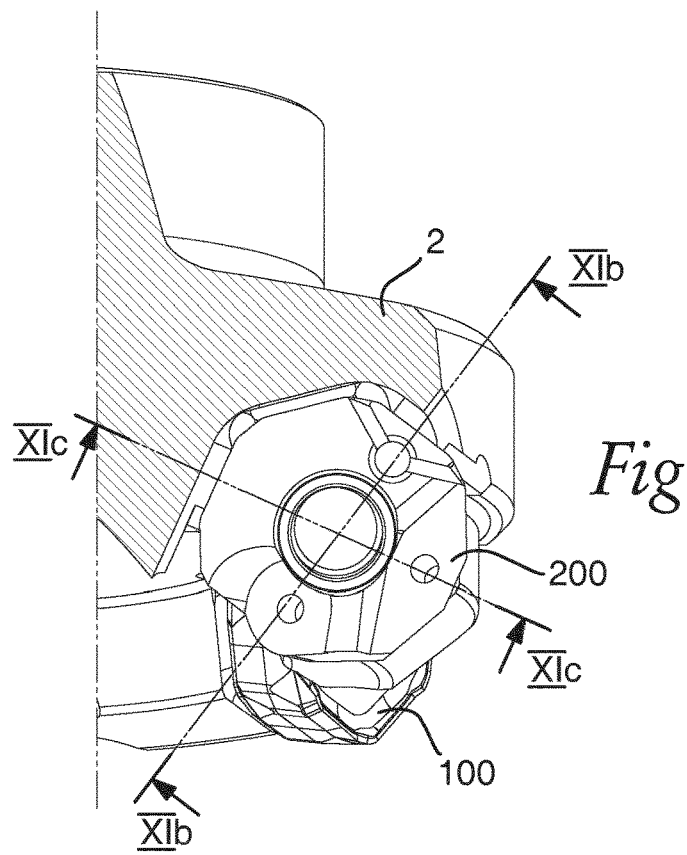
FIG. 11a is a perspective partial view of the milling tool in FIG. 8.
Figure 11B:
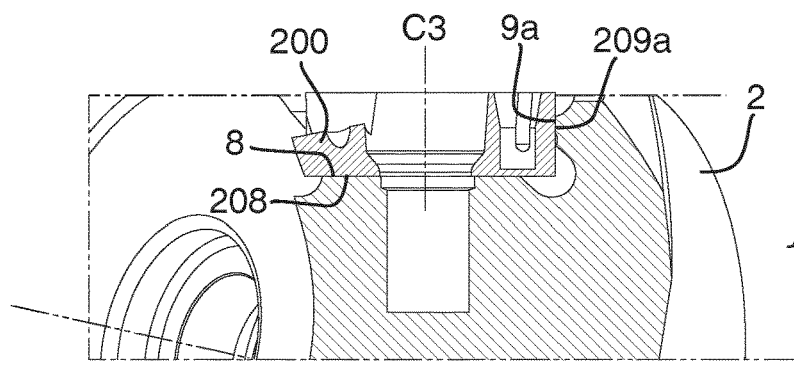
FIG. 11b is a cross sectional view along the line XIb-XIb in FIG. 11a, FIG. 11c is a cross sectional view along the line XIc-XIc in FIG. 11a, FIG. 12a is a perspective view of a part of the milling tool which is common for both embodiments.
Figure 11C:
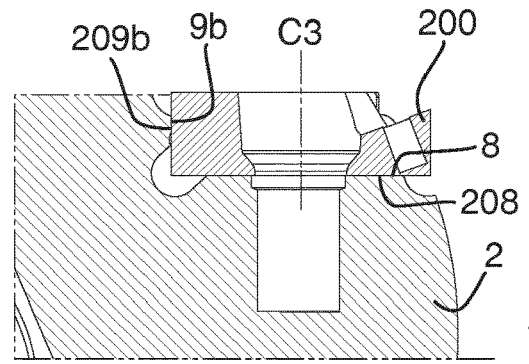
Figure 12A:
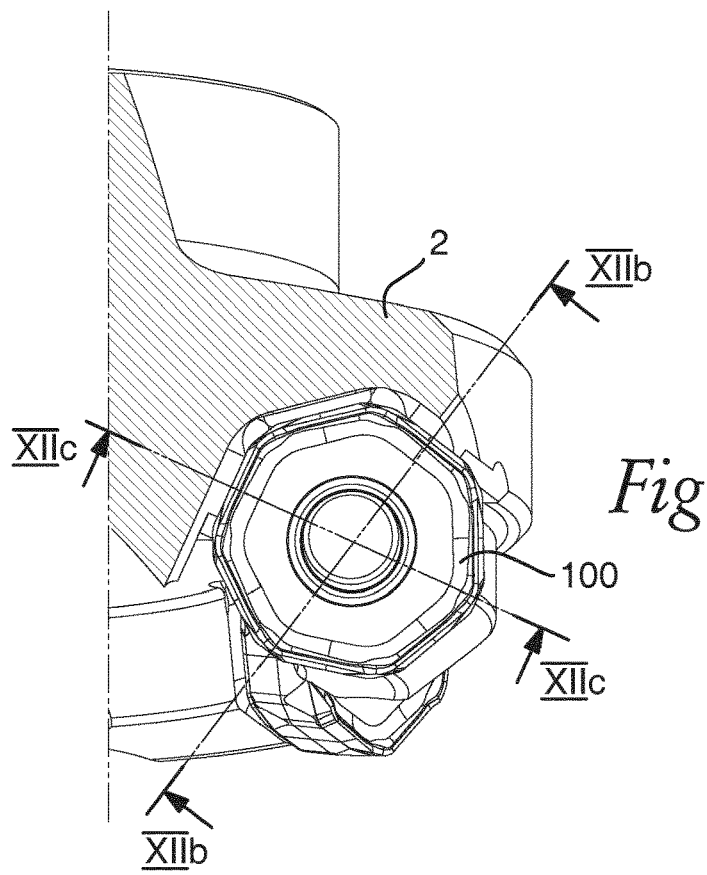
Figure 12B:
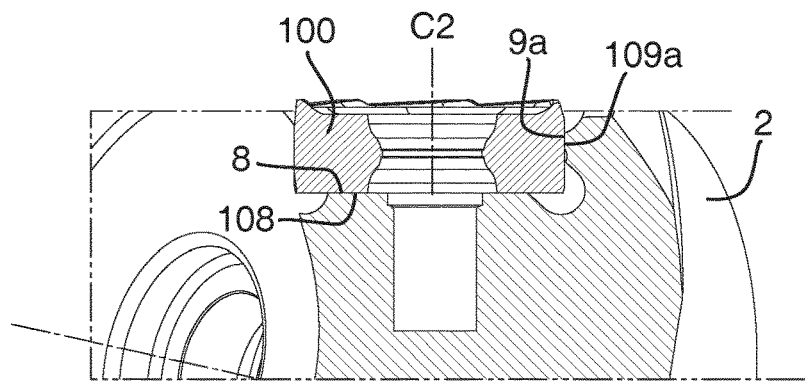
Figure 12C:
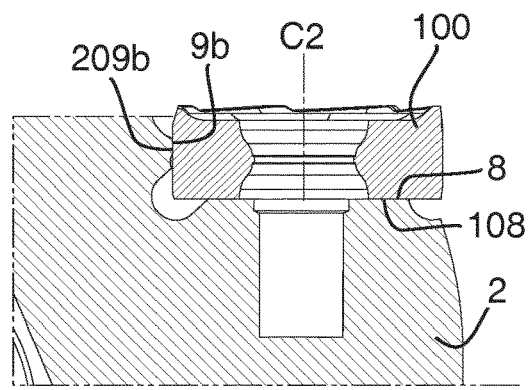

More precisely, the cassette 200 has in both embodiments an upper side 201 and a lower side 202, between which a peripheral side surface 203 and a central axis C3 extend. The lower side 202 of the cassette 200 includes a bottom support surface 208 configured to rest against the bottom contact surface 8 of the insert seat 6 of the tool body 2, thus providing support for the cassette 200 in the tangential direction being parallel to the direction of rotation of the milling tool 1 such as shown in FIGS. 11a-11c. The bottom support surface 208 therefore has the same dimension and form as the bottom support surface 108 of the primary cutting inserts 100 as can be seen in FIGS. 10a-10b, and an interface between the bottom contact surface 8 and each of the bottom support surfaces 108, 208 is identical. The cassette 200 further has two side support surfaces 209a, 209b formed in the peripheral side surface 203, together configured to support the cassette 200 in the axial and radial directions of the milling tool 1. Since the cassette 200 is configured to be mounted in any one of the insert seats 6 of the tool body 2, the side support surfaces 209a, 209b have the same dimension and form as the side support surfaces 109a, 109b of the primary cutting inserts 100, such that an interface between the side contact surface 9a of the seat 6 and each of the side support surfaces 109a, 209a is identical as can be seen by comparing FIGS. 11a-11c to FIGS. 12a-12c. Likewise, the interface between the side contact surface 9b of the insert seat 6 and each of the side support surfaces 109b, 209b is identical. The side and bottom contact surfaces of the tool body and/or the side and bottom support surfaces of the cassette and the primary cutting insert, respectively, may of course be designed in different ways, as long as the primary cutting insert and the cassette can be supported by the same contact surfaces of the tool body such that they can be exchangeably mounted in the same insert seat of the tool body.

In the first embodiment shown in FIGS. 5-6, an insert seat 204 configured to support a secondary cutting insert 300 in the form of a wiper insert is formed in a transition between the upper side 201 and the peripheral side surface 203 of the cassette 200. The insert seat 204 is formed as a recess in the upper side 201 and the peripheral side surface 203 of the cassette 200, so that the secondary cutting insert 300 is entirely supported by the cassette 200 and, when mounted, is not in contact with the tool body 2.

The secondary cutting insert 300 is in this embodiment a wiper insert mounted in the insert seat 204 using a screw 11. It has a rhombic basic shape and is single-sided with two index positions, thus having a positive cutting geometry with an upper side 301, a lower side 302 and a side surface 303 extending there between. A cutting edge 304 comprising two main cutting edges 305 configured for main chip removing machining and two wiper edges 306 for generating a smooth surface is formed in a transition between the upper side 301 and the side surface 303.

During machining of a workpiece, the active main cutting edge 305 of the secondary cutting insert 300 is configured to enter the workpiece at an entering angle κ which is the same as for the active main cutting edges 105 of the primary cutting inserts 100. The main cutting edge 305 of the secondary cutting insert 300 therefore has the same function as the main cutting edges 105 of the primary cutting inserts 100. The wiper edge 306 is however much longer than the surface-wiping edges 107 of the primary cutting inserts 100 and is also slightly curved (i.e. including a large wiper edge radius as known in the prior art). The wiper edge 306 therefore efficiently removes irregularities from the surface of the workpiece such that a smooth surface is generated during face milling.

In the second embodiment shown in FIG. 9 and FIG. 10a, the cassette 200 has a first insert seat 205 and a second insert seat 206 formed in the transition between its upper side 201 and its peripheral side surface 203, i.e. a total of two insert seats 205, 206. The first insert seat 205, which when mounted in the milling tool 1 is positioned radially inside of the second insert seat 206, is configured to receive and support a secondary cutting insert 400 in the form of a ramping insert mounted using a screw 11.

The second insert seat 206 is configured to receive and support another secondary cutting insert 500 having a main cutting edge 505 configured for chip removing machining at an entering angle κ which is the same as for the active main cutting edges 105 of the primary cutting inserts 100.

The secondary cutting insert 400 in the form of a ramping insert has a round basic shape and is single-sided, thus having a positive cutting geometry with an upper side 401, a lower side 402 and a side surface 403 extending there between. A circular cutting edge 404 is formed in a transition between the upper side 401 and the side surface 403. The positive cutting geometry provides a relatively large clearance behind the cutting edge 404, so that the secondary cutting insert 400 can be used for cutting during a ramping operation of the milling tool 1.

The other secondary cutting insert 500 is mounted in the insert seat 206 using a screw 11 and is identical to the secondary cutting insert 300 shown in FIG. 5, but it is mounted in a different position and is used differently. It has a rhombic basic shape and is single-sided with two index positions, thus having a positive cutting geometry with an upper side 501, a lower side 502 and a side surface 503 extending there between. A cutting edge 504 comprising two main cutting edges 505 configured for main chip removing machining is formed in a transition between the upper side 501 and the side surface 503. The part of the cutting edge 504 which was in the first embodiment used as a wiper edge is in this embodiment used as the main cutting edge 505, while the part of the cutting edge which was in the first embodiment used as the main cutting edge is in this embodiment inactive. Thus, this secondary cutting insert 500 is exclusively used for chip removing machining together with the primary cutting inserts 100.

The cassette 200 is in both of the shown embodiments adjustable by means of a positioning screw 12. The cassette 200 is for this purpose divided into a major portion 210 and a minor portion 211. Between the minor portion 211 and the major portion 210, a hole 212 for receiving the positioning screw 12 is provided. Two grooves 213, 214 are formed in the upper side 201 of the cassette 200 between the hole 212 and the peripheral side surface 203, thus separating the major portion 210 from the minor portion 211. The major portion 210 of the cassette 200 comprises the insert seat 204 or insert seats 205, 206, while the minor portion 211 comprises the outermost side support surface 209a. A turning of the positioning screw 12 in hole 212 adjusts the position of the cassette 200 within the insert seat 6 of the tool body 2 by adjusting the distance between the major portion 210 and the minor portion 211 of the cassette 200. In other words, the width of the grooves 213, 214 increases upon tightening the positioning screw 12 into the hole 212 and vice versa, whereby the distance between the major and minor portions 210, 211 of the cassette 200 is adjusted.

Hence, the cassette 200 has an inherent elasticity suitably provided by producing it in a steel material, whereby the grooves 213, 214 provide an elastic deformation, so that the distance is adjusted when operating the positioning screw 12. This is particularly relevant when two or more cassettes 200 with wiper inserts, e.g. according to the first embodiment shown in FIGS. 5-6, are mounted in the tool body 2, in which case the wiper edges 306 may require individual adjustment in order to be positioned at the same axial level at the front end 3 of the tool body 2.

The invention is of course not limited to the embodiments disclosed, but may be varied and modified within the scope of the following claims. For instance, fastening means other than screws, such as e.g. clamps, may be used for fastening the cassette, the primary cutting insert and the secondary cutting insert. The primary and secondary cutting inserts may further have a different shape than the shapes shown and described above, and may be cutting inserts having positive or negative cutting geometries depending on the application. The milling tool may further be configured for either right hand rotation or left hand rotation. It is also possible to have a shim plate mounted below the primary cutting inserts and the cassettes, in which case the bottom support surface of each of the cassette and the cutting insert rests against an upper surface of the shim plate, which in turn has a lower surface resting against the bottom contact surface of the seat of the tool body.

The invention claimed is:

1. A kit for a milling tool for chip removing machining, the kit comprising:
   a tool body including a front end and a rear end, between which a central axis of rotation and a peripheral envelope surface extend, and at least two identical insert seats formed in a transition between the front end and the peripheral envelope surface, wherein each insert seat is configured to support a cutting insert arranged to be mounted therein, a bottom contact surface and at least one side contact surface provided in each insert seat for supporting a bottom support surface and at least one side support surface of the cutting insert, respectively;
   at least one cassette including an upper side, a lower side having a bottom support surface, a peripheral side surface extending between the upper side and the lower side, wherein the peripheral side surface includes at least one side support surface, and at least one insert seat configured to support a secondary cutting insert formed in a transition between the upper side and the peripheral side surface, wherein the at least one side support surface and the bottom support surface of the cassette are configured to be supported by the at least one side contact surface and the bottom contact surface, respectively, of any one of the identical insert seats of the tool body, the cassette being configured to be detachably mounted in any one of the at least two identical insert seats of the tool body; and
   means for adjusting a position of the cassette within any one of the identical insert seats of the tool body, the means for adjusting the position of the cassette includes a positioning screw and a hole for receiving the positioning screw located between a major portion and a minor portion of the cassette, the major and minor portions being separated by two grooves extending between the hole and the peripheral side surface of the cassette, the means for adjusting the position being arranged to, upon turning of the positioning screw in the hole, adjust a distance between the major portion and the minor portion of the cassette, wherein the minor portion includes the side support surface of the cassette.

2. The kit according to claim 1, wherein the cassette includes two insert seats formed in the transition between the upper side and the side surface.

3. The kit according to claim 1, wherein the cassette is made of steel.

4. A milling tool for chip removing machining, comprising:
a kit, the kit including a tool body including a front end and a rear end, between which a central axis of rotation and a peripheral envelope surface extend, and at least two identical insert seats formed in a transition between the front end and the peripheral envelope surface, wherein each insert seat of the tool body includes a bottom contact surface and at least one side contact surface provided in each insert seat, and at least one cassette including an upper side, a lower side having a bottom support surface, a peripheral side surface extending between the upper side and the lower side, wherein the peripheral side surface of the cassette includes at least one side support surface, and at least one insert seat formed in a transition between the upper side and the peripheral side surface, wherein the at least one side support surface and the bottom support surface of the cassette are configured to be supported by the at least one side contact surface and the bottom contact surface, respectively, of any one of the identical insert seats of the tool body, the cassette being configured to be detachably mounted in any one of the at least two identical insert seats of the tool body;
a primary cutting insert including a cutting edge and being configured to be mounted in one of the identical insert seats of the tool body, wherein the primary cutting insert has a bottom support surface configured to be supported by the bottom contact surface of the insert seat of the tool body and at least one side support surface configured to be supported by the at least one side contact surface of the insert seat of the tool body when the primary cutting insert is mounted therein; and
a secondary cutting insert including a cutting edge and being configured to be mounted in the at least one insert seat of the cassette, wherein the cassette is mountable in one of the identical insert seats of the tool body, wherein the secondary cutting insert includes a wiper edge, and wherein the insert seat of the cassette is configured to receive the secondary cutting insert so that, when the cassette is mounted in the insert seat of the tool body, the wiper edge extends perpendicularly in relation to the central axis of rotation and is situated axially foremost at the front end of the milling tool arranged for performing a surface finishing operation during face milling.

5. The milling tool according to claim 4, wherein the secondary cutting insert includes a main cutting edge, and wherein the insert seat of the cassette is configured to receive the secondary cutting insert so that, when the cassette is mounted in the insert seat of the tool body, the main cutting edge extends at an entering angle for a main chip removing machining operation.

6. The milling tool according to claim 4, wherein the secondary cutting insert includes a ramping edge, and wherein the insert seat of the cassette is configured to receive the secondary cutting insert so that, when the cassette is mounted in the insert seat of the tool body, the ramping edge extends along a radially inner portion of the insert seat for cutting during a ramping operation of the milling tool.

7. The milling tool according to claim 4, wherein the cassette includes two insert seats and wherein the milling tool includes two secondary cutting inserts, each mounted in one of the insert seats.

8. The milling tool according to claim 4, wherein the secondary cutting insert is a single-sided indexable cutting insert with a positive cutting geometry.

9. The milling tool according to claim 4, wherein the cutting edge of the secondary cutting insert includes a portion made of cubic boron nitride or polycrystalline diamond.

10. The milling tool according to claim 4, wherein the primary cutting insert is an indexable face milling insert having several indexable cutting edges, wherein each indexable cutting edge includes a main cutting edge configured for a main chip removing machining operation and a secondary cutting edge configured for surface finishing operation.

11. The milling tool according to claim 4, wherein the cassette includes a means for adjusting a position of the cassette within any one of the identical insert seats of the tool body.

12. The milling tool according to claim 11, wherein the means for adjusting the position of the cassette includes a positioning screw and a hole for receiving the positioning screw located between a major portion and a minor portion of the cassette, the major and minor portions being separated by two grooves extending between the hole and the peripheral side surface of the cassette, the means for adjusting the position being arranged to, upon turning of the positioning screw in the hole, adjust a distance between the major portion and the minor portion of the cassette, wherein the minor portion includes the side support surface of the cassette.

13. The milling tool according to claim 4, wherein the cassette is made of steel.

* * * * *